US011655851B2

United States Patent
Nagai et al.

(10) Patent No.: US 11,655,851 B2
(45) Date of Patent: May 23, 2023

(54) BEARING DEVICE AND ROTATING DEVICE

(71) Applicant: MITSUBISHI HEAVY INDUSTRIES ENGINE & TURBOCHARGER, LTD., Sagamihara (JP)

(72) Inventors: Naoyuki Nagai, Tokyo (JP); Takuya Arakawa, Tokyo (JP); Takaya Futae, Tokyo (JP); Shuichi Miura, Tokyo (JP); Yosuke Dammoto, Sagamihara (JP); Akihiro Sugiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 75 days.

(21) Appl. No.: 17/437,672

(22) PCT Filed: Mar. 22, 2019

(86) PCT No.: PCT/JP2019/012114
§ 371 (c)(1),
(2) Date: Sep. 9, 2021

(87) PCT Pub. No.: WO2020/194381
PCT Pub. Date: Oct. 1, 2020

(65) Prior Publication Data
US 2022/0163064 A1 May 26, 2022

(51) Int. Cl.
*F16C 27/04* (2006.01)
*F16C 19/06* (2006.01)
(Continued)

(52) U.S. Cl.
CPC ............ *F16C 27/045* (2013.01); *F16C 19/06* (2013.01); *F16C 33/586* (2013.01);
(Continued)

(58) Field of Classification Search
CPC ...... F16C 19/06; F16C 27/045; F16C 33/586; F16C 33/6659; F16C 33/6666;
(Continued)

(56) References Cited

FOREIGN PATENT DOCUMENTS

| CN | 103477099 B | * | 10/2016 | ............ F01D 25/125 |
| DE | 112016003110 T5 | * | 4/2018 | ............. F01D 25/16 |

(Continued)

OTHER PUBLICATIONS

International Preliminary Report on Patentability and Written Opinion of the International Searching Authority for International Application No. PCT/JP2019/012114, dated Oct. 7, 2021, with English translation.
(Continued)

*Primary Examiner* — Phillip A Johnson
(74) *Attorney, Agent, or Firm* — Birch, Stewart, Kolasch & Birch, LLP

(57) ABSTRACT

A bearing device according to an embodiment is a bearing device for rotatably supporting a rotational shaft, the device including at least one rolling bearing which includes an inner race fixed to the rotational shaft, a rolling element, and an outer race for rotatably holding the rolling element with the inner race, and a casing for housing the rolling bearing, the casing including a plurality of first oil supply holes formed at intervals in a circumferential direction for supplying lubricant oil to a first gap between the rolling bearing and an inner circumferential surface of the casing. Each of the plurality of first oil supply holes satisfies:

$$\pi \cdot d_1 \cdot \delta_1 < \pi \cdot d_1^2 / 4, \quad (a)$$

where $d_1$ is a diameter of an outlet opening of the first oil supply hole, and $\delta_1$ is a space of the first gap.

12 Claims, 6 Drawing Sheets

(51) Int. Cl.
*F16C 33/58* (2006.01)
*F16C 33/66* (2006.01)
*F16C 35/077* (2006.01)

(52) U.S. Cl.
CPC ...... *F16C 33/6666* (2013.01); *F16C 33/6681* (2013.01); *F16C 35/077* (2013.01)

(58) Field of Classification Search
CPC .. F16C 33/6681; F16C 35/067; F16C 35/077; F16C 2360/24
See application file for complete search history.

(56) References Cited

FOREIGN PATENT DOCUMENTS

| EP | 2500544 A1 | * | 9/2012 | ............. F01D 25/16 |
|----|-----------|---|--------|--------------------------|
| JP | 46-28242 B |   | 8/1971 |                          |
| JP | 54-10141 U |   | 1/1979 |                          |
| JP | 58-156718 A |  | 9/1983 |                          |
| JP | 63-69815 U |   | 5/1988 |                          |
| JP | 5-19642 U  |   | 3/1993 |                          |
| JP | 2724349 B2 |   | 12/1997 |                         |
| JP | 2003-83325 A |  | 3/2003 |                         |
| JP | 2003-139134 A | | 5/2003 |                          |
| JP | 2004-339986 A | | 12/2004 |                         |
| JP | 2010138753 A | * | 6/2010 |                         |
| JP | 2013-204740 A | | 10/2013 |                         |
| JP | 2014-20461 A |  | 2/2014 |                          |

OTHER PUBLICATIONS

International Search Report for International Application No. PCT/JP2019/012114, dated Apr. 23, 2019.

Office Action dated Oct. 25, 2022 issued in counterpart Chinese Application No. 201980094333.6 with an English Translation.

* cited by examiner

Statically determinate position | Eccentric position

Enlarged A portion

BEARING DEVICE AND ROTATING DEVICE

TECHNICAL FIELD

The present disclosure relates to a bearing device and a rotating device.

BACKGROUND

If a rotational shaft is supported by a rolling bearing in a rotating device such as a turbocharger, contact between a rotary portion and a stationary portion of the rolling bearing is metal contact, and is thus poor in vibration damping capacity. Therefore, the rolling bearing has a high vibration sensitivity in high rotation, or disturbance or the like, which is likely to lead to breakage, occurrence of abnormal noise, or the like. Patent Document 1 discloses a vibration suppressing means for forming an oil film in a gap between an outer race of a rolling bearing for supporting a rotational shaft of a pump and a casing for housing the rolling bearing, and giving a damping effect by a squeeze action of the oil film.

CITATION LIST

Patent Literature

Patent Document 1: JP2004-339986A

SUMMARY

Technical Problem

The vibration suppressing means by the squeeze action of the oil film cannot exert the vibration damping effect, unless the oil film is formed properly. Thus, it is necessary to arrange an outer race at a position capable of forming the oil film with respect to the casing. The means disclosed in Patent Document 1 is a simple means with a configuration in which oil is just injected into the gap between the casing and the outer race of the rolling bearing, whereas the means does not include a positioning mechanism of the rolling bearing for forming the oil film, and is thus considered having a decreased vibration damping effect. If a positioning member such as an O-ring or a metallic spring is used as a mechanical positioning means of the rolling bearing, in order to exert the vibration damping effect by the oil film, it is necessary to decrease the rigidity of the mechanical positioning member to be lower than the rigidity of the rolling bearing by at least single digit. However, the problem arises in that a rubber O-ring has poor durability, whereas the metallic spring has high rigidity and is likely to suffer from fatigue failure if used under a high-temperature environment like a turbocharger.

An object of an embodiment according to the present disclosure is to provide a bearing device capable of forming a good oil film in a gap between a casing and an outer race of a rolling bearing without using a mechanical means, if a rotational shaft is supported by the rolling bearing.

Solution to Problem (1) A bearing device according to an embodiment is a bearing device for rotatably supporting a rotational shaft, the device including at least one rolling bearing which includes an inner race fixed to the rotational shaft, a rolling element, and an outer race for rotatably holding the rolling element with the inner race, and a casing for housing the rolling bearing, the casing including a plurality of first oil supply holes formed at intervals in a circumferential direction for supplying lubricant oil to a first gap between the rolling bearing and an inner circumferential surface of the casing. Each of the plurality of first oil supply holes satisfies:

$$\pi \cdot d_1 \cdot \delta_1 < \pi \cdot d_1^2 / 4, \tag{a}$$

where $d_1$ is a diameter of an outlet opening of the first oil supply hole, and $\delta_1$ is a space of the first gap.

With the above configuration (1), having the configuration satisfying the above-described expression (a), the first gap configures so-called self-squeeze for the oil film to exert an squeeze action, and thus it is possible to form a good oil film in the gap between the casing and the outer race of the rolling bearing without using a mechanical means. If the rotational shaft is eccentric due to a vibration, a pressure loss increases and a high pressure is obtained as the first gap is narrowed, and thus a reverse force from an eccentric direction acts on the rotational shaft, restoring the rotational shaft to a previous statically determinate position. Thus, it is possible to hold the oil film in the first gap, and it is possible to damp the vibration of the rotational shaft even if the rotational shaft vibrates.

(2) In an embodiment, in the above configuration (1), the plurality of first oil supply holes are disposed symmetrically with respect to an axis of the rotational shaft in a cross-section of the rotational shaft.

With the above configuration (2), since the plurality of first oil supply holes are disposed symmetrically with respect to the axial center of the rotational shaft, it is possible to equally supply the lubricant oil to the first gap in the circumferential direction of the rotational shaft. Thus, it is possible to form the good oil film in the first gap.

(3) In an embodiment, in the above configuration (1) or (2), in an opposite surface opposite to the inner circumferential surface of the casing across the first gap, a first recess is formed which is configured such that a cross-sectional area thereof in a direction orthogonal to an axis of the rotational shaft decreases from a position where the cross-sectional area is maximum toward at least one side in an axial direction.

With the above configuration (3), the lubricant oil supplied from the first oil supply holes to the above-described first recess accelerates toward the axial direction of the rotational shaft (may simply be referred to as the "axial direction", hereinafter) along the surface of the first recess, and a normal component force is generated with respect to the surface of the first recess by a dynamic pressure of the lubricant oil. The normal component force becomes a force of restoring the eccentric rotational shaft to the statically determinate position. Therefore, in the present embodiment, it is possible to have both of a self-squeeze effect on the oil film and an alignment effect in the radial direction of the rotational shaft by the dynamic pressure of the lubricant oil. Thus, it is possible to hold the oil film in the first gap, and to suppress the radial vibration of the rotational shaft.

(4) In an embodiment, in the above configuration (3), the first recess is configured such that a depth thereof decreases toward the one side in the axial direction.

With the above configuration (4), since the lubricant oil supplied from the first oil supply holes to the above-described first recess accelerates toward the axial direction of the rotational shaft, it is possible to further increase the self-squeeze effect of the oil film and the alignment effect in the radial direction of the rotational shaft by the dynamic pressure of the lubricant oil.

(5) In an embodiment, in the above configuration (3) or (4), the first recess is configured such that the cross-sectional area decreases from the position where the cross-sectional area is maximum toward each of the one side and another side in the axial direction, and is configured such that a distance from the position where the cross-sectional area is maximum to an end portion on the one side in the axial direction and a distance from the position where the cross-sectional area is maximum to an end portion on the another side in the axial direction are equal.

In the above configuration (5), if the lubricant oil is supplied to the first recess, the lubricant oil is branched to the one side and the another side in the axial direction on the surface of the first recess. Thus, depending on a position where the lubricant oil is supplied, it is possible to generate a force of moving the rotational shaft to the one side or the another side. For example, if the lubricant oil is supplied to the position where the cross-sectional area is maximum, a distribution of the normal component force generated on the surface of the first recess along the axial direction is symmetrical about the position where the cross-sectional area is maximum. Therefore, if the rotational shaft moves in the axial direction from the statically determinate position due to the vibration or the like, the distribution of the normal component force generated on the surface of the first recess along the axial direction is asymmetric. Therefore, the dynamic pressure of the lubricant oil acting on the surface of the first recess in an opposite direction to the moving direction of the rotational shaft increases, applying a force of restoring the rotational shaft to an original statically determinate position. According to the present embodiment, in addition to the self-squeeze effect of the oil film and the alignment effect in the radial direction by the dynamic pressure of the lubricant oil, it is possible to exert an alignment effect in a thrust direction (the axial direction of the rotational shaft).

(6) In an embodiment, in any one of the above configurations (3) to (5), the first recess is configured such that the position where the cross-sectional area is maximum is opposite to the outlet opening of the first oil supply hole.

In the above configuration (6), when the rotational shaft is at the statically determinate position, the lubricant oil discharged from the outlet opening of the first oil supply hole is supplied to the position where the cross-sectional area of the first recess is maximum, making it possible to efficiently convert kinetic energy of the lubricant oil into the dynamic pressure acting on the surface of the first recess.

(7) In an embodiment, in any one of the above configurations (3) to (6), the at least one rolling bearing includes a plurality of rolling bearings disposed at intervals in the axial direction of the rotational shaft, the bearing device further includes a cover member configured to cover respective perimeters of the plurality of rolling bearings, and the opposite surface is constituted by an outer circumferential surface of the cover member.

With the above configuration (7), since the above-described cover member is provided, and the first recess is formed in the outer circumferential surface of the cover member, the dynamic pressure of the lubricant oil is transmitted to the rolling bearings via the cover member. Therefore, an equal force acts on each of the plurality of rolling bearings from the cover member, and the respective rolling bearings are uniformly moved by the cover member, making it possible to improve the alignment effect with respect to the rotational shaft.

(8) In an embodiment, in the above configuration (7), the casing forms a second oil supply hole for supplying the lubricant oil to a second gap between an inner surface of the casing and an axial one end surface of the cover member, and a third oil supply hole for supplying the lubricant oil to a third gap between the inner surface of the casing and an axial another end surface of the cover member, and each of the plurality of first oil supply holes satisfies:

$$\pi \cdot d_2 \cdot \delta_2 < \pi \cdot d_2^2 / 4, \qquad (b)$$

where $d_2$ is a diameter of an outlet opening of the second oil supply hole, and $\delta_2$ is a space of the second gap; and $$\pi \cdot d_3 \cdot \delta_3 < \pi \cdot d_3^2 / 4, \qquad (c)$$

where $d_3$ is a diameter of an outlet opening of the third oil supply hole, and $\delta_3$ is a space of the third gap.

With the above configuration (8), since self-squeeze by the squeeze action of the oil film is configured when the lubricant oil supplied from the second oil supply hole and the third oil supply hole passes through the second gap and the third gap, respectively, it is possible to form the good oil film in the second gap and the third gap without using the mechanical means, and even if the rotational shaft moves to one side or another side in the thrust direction from the statically determinate position due to the vibration, it is possible to damp the vibration in the thrust direction and to exert the alignment effect of restoring the rotational shaft to the original statically determinate position. Therefore, it is possible to have both of the alignment effect in the radial direction by self-squeeze on the lubricant oil supplied from the first oil supply holes, and the alignment effect in the thrust direction by self-squeeze on the lubricant oil supplied from the second oil supply hole and the third oil supply hole.

(9) In an embodiment, in the above configuration (8), in the axial one end surface opposite to the inner circumferential surface of the casing across the second gap, a second recess is formed which is configured such that a cross-sectional area thereof in a direction parallel to the axis of the rotational shaft decreases from a position where the cross-sectional area is maximum toward at least one side in a radial direction, and in the axial another end surface opposite to the inner circumferential surface of the casing across the third gap, a third recess is formed which is configured such that a cross-sectional area thereof in the direction parallel to the axis of the rotational shaft decreases from a position where the cross-sectional area is maximum toward the at least one side in the radial direction.

With the above configuration (9), the lubricant oil supplied from the second oil supply hole to the second recess accelerates toward the radial direction, generating the normal component force with respect to the surface of the second recess by the dynamic pressure of the lubricant oil. The normal component force becomes a force of restoring the rotational shaft moved in the thrust direction to the statically determinate position. The same normal component force acts also in the lubricant oil supplied from the third oil supply hole to the third recess. Therefore, in the present embodiment, it is possible to have both of the self-squeeze effect of the oil film and the alignment effect in the radial direction of the rotational shaft by the dynamic pressure of the lubricant oil. Thus, it is possible to exert the vibration damping effect even if the rotational shaft vibrates in the radial direction. Therefore, it is possible to have both of the self-squeeze effect on the oil film supplied from the first oil supply holes and the alignment effect in the radial direction by the first recess, and the self-squeeze effect on the oil film supplied from the second oil supply hole and the third oil supply hole and the alignment effect in the thrust direction by the second recess and the third recess.

(10) A bearing device according to an embodiment is a bearing device for rotatably supporting a rotational shaft, the device including a plurality of rolling bearings disposed at intervals in an axial direction of the rotational shaft, the rolling bearings each including an inner race fixed to the rotational shaft, a rolling element, and an outer race for rotatably holding the rolling element with the inner race, a cover member configured to cover respective perimeters of the plurality of rolling bearings, and a casing for housing the plurality of rolling bearings and the cover member, the casing forming a second oil supply hole for supplying lubricant oil to a second gap between an inner surface of the casing and an axial one end surface of the cover member, and a third oil supply hole for supplying the lubricant oil to a third gap between the inner surface of the casing and an axial another end surface of the cover member. The second oil supply hole satisfies:

$$\pi \cdot d_2 \cdot \delta_2 < \pi \cdot d_2^2/4 \qquad (b)$$

, where $d_2$ is a diameter of an outlet opening of the second oil supply hole, and $\delta_2$ is a space of the second gap, and the third oil supply hole satisfies:

$$\pi \cdot d_3 \cdot \delta_3 < \pi \cdot d_3^2/4 \qquad (c)$$

, where $d_3$ is a diameter of an outlet opening of the third oil supply hole, and $\delta_3$ is a space of the third gap.

With the above configuration (10), since so-called self-squeeze by the squeeze action of the oil film is configured when the lubricant oil supplied from the second oil supply hole and the third oil supply hole passes through the second gap and the third gap, respectively, it is possible to form the good oil film in the second gap and the third gap without using the mechanical means, and even if the rotational shaft moves to one side or another side in the thrust direction from the statically determinate position due to the vibration, it is possible to damp the vibration in the thrust direction and to exert the alignment effect of restoring the rotational shaft to the original statically determinate position.

(11) In an embodiment, in the above configuration (10), in the axial one end surface opposite to the inner surface of the casing across the second gap, a second recess is formed which is configured such that a cross-sectional area thereof in a direction parallel to the axis of the rotational shaft decreases from a position where the cross-sectional area is maximum toward at least one side in a radial direction, and in the axial another end surface opposite to the inner surface of the casing across the third gap, a third recess is formed which is configured such that a cross-sectional area thereof in the direction parallel to the axis of the rotational shaft decreases from a position where the cross-sectional area is maximum toward the at least one side in the radial direction.

With the above configuration (11), the lubricant oil supplied from the second oil supply hole to the second recess accelerates toward the radial direction, generating the normal component force with respect to the surface of the second recess by the dynamic pressure of the lubricant oil. The normal component force becomes a force of restoring the rotational shaft moved in the thrust direction to the statically determinate position. The same normal component force acts also in the case where the lubricant oil is supplied from the third oil supply hole to the third recess. Therefore, it is possible to have both of the self-squeeze effect on the oil film and the alignment effect in the radial direction of the rotational shaft by the dynamic pressure of the lubricant oil. Thus, it is possible to exert the vibration damping effect even if the rotational shaft vibrates in the radial direction. Thus, a thrust bearing provided for the rotational shaft can be omitted, in some cases.

(12) A rotating device according to an embodiment includes a rotational shaft, and the bearing device according to any one of the above configurations (1) to (11).

With the above configuration (12), including the bearing device of the above-described configuration, self-squeeze by the squeeze action of the lubricant oil film is configured in the gap between the rolling bearing and the casing for housing the rolling bearing, and thus it is possible to form the good oil film in the gap between the casing and the outer race of the rolling bearing without using the mechanical means. Therefore, it is possible to damp the vibration of the rotational shaft even if the rotational shaft vibrates.

Advantageous Effects

According to some embodiments, it is possible to form a good oil film in a gap between a casing and an outer race of a rolling bearing by self-squeeze of lubricant oil, without using a mechanical means. Thus, it is possible to suppress a vibration of a rotational shaft.

DETAILED DESCRIPTION

Figure 1:
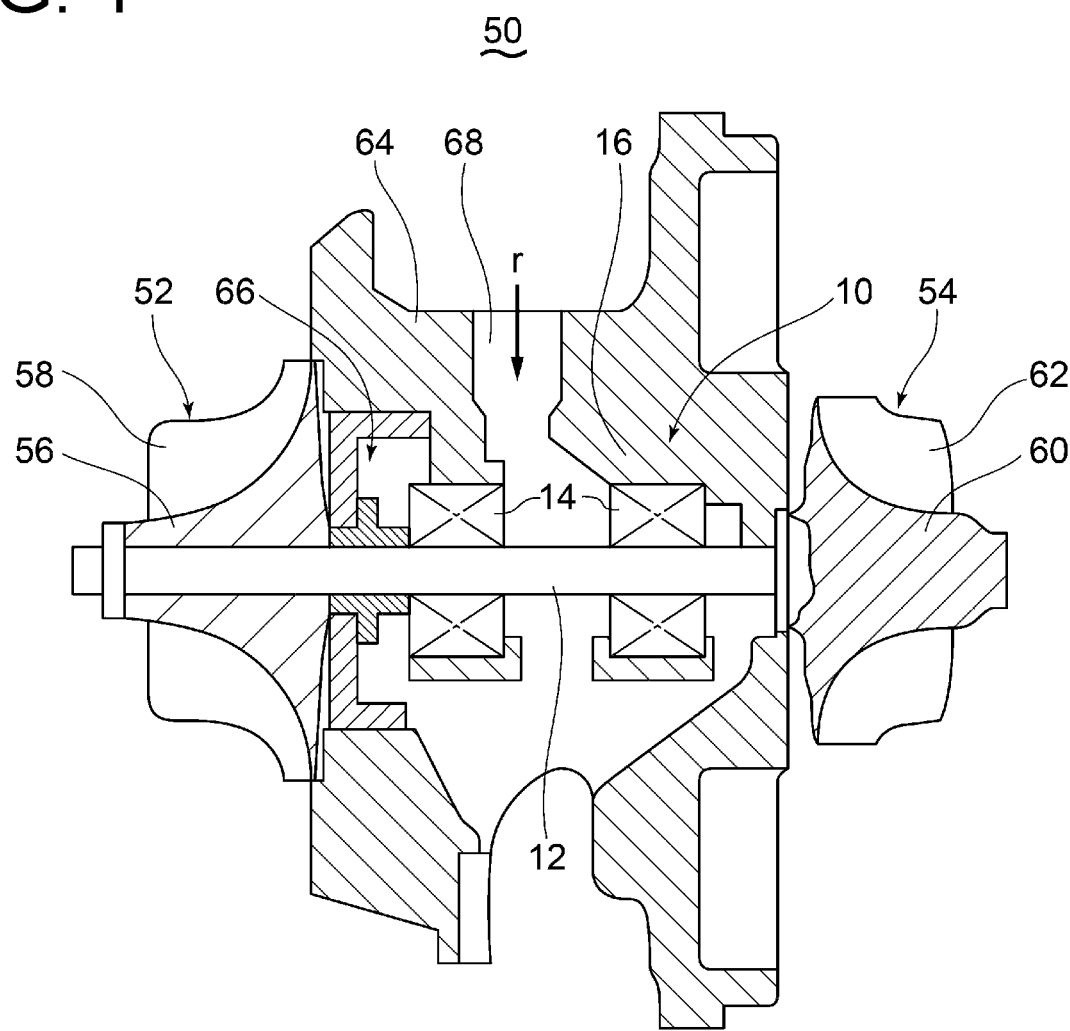
FIG. 1 is a vertical cross-sectional view of a rotating device including a bearing device according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
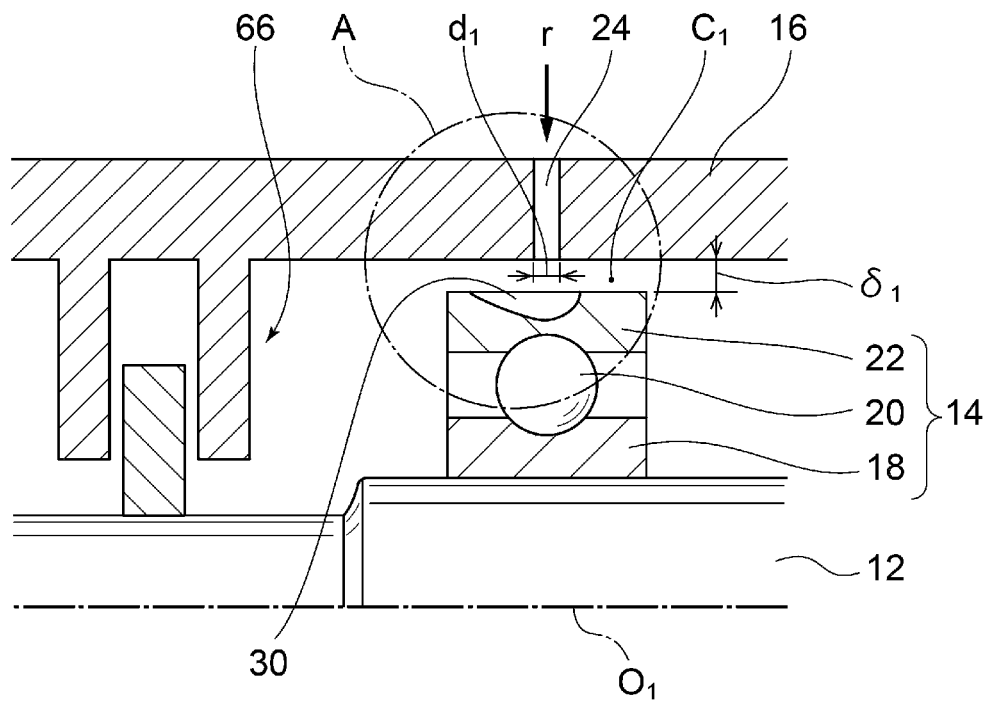
FIG. 2 is a vertical cross-sectional view of the bearing device according to an embodiment.

FIG. 1 is a vertical cross-sectional view of a rotating device 50 including a bearing device 10 according to a bearing device. FIG. 2 is a vertical cross-sectional view of the bearing device 10 (10A) according to an embodiment. The bearing device 10 (10A) includes at least one rolling bearing 14 for supporting a rotational shaft 12 rotatably about an axis $O_1$, and the rolling bearing 14 is housed in a casing 16. The rolling bearing 14 is formed by an inner race 18 fixed to the rotational shaft 12, a rolling element 20, and an outer race 22 for rotatably holding the rolling element 20 with the inner race 18. The casing 16 includes a plurality of oil supply holes 24 (24a, 24b, 24c, 26d) (first oil supply holes) formed at intervals in the circumferential direction, and high-pressure lubricant oil r is supplied to a gap $C_1$ (first gap) between the rolling bearing 14 and an inner surface 16a of the casing 16 via the plurality of oil supply holes 24 (24a to 24d). Each of the oil supply holes 24 satisfies:

$$\pi \cdot d_1 \cdot \delta_1 < \pi \cdot d_1^2/4, \qquad (a)$$

where $d_1$ is a diameter of an outlet opening of the oil supply hole 24, and $\delta_1$ is a space of the gap $C_1$.

Figure 3:
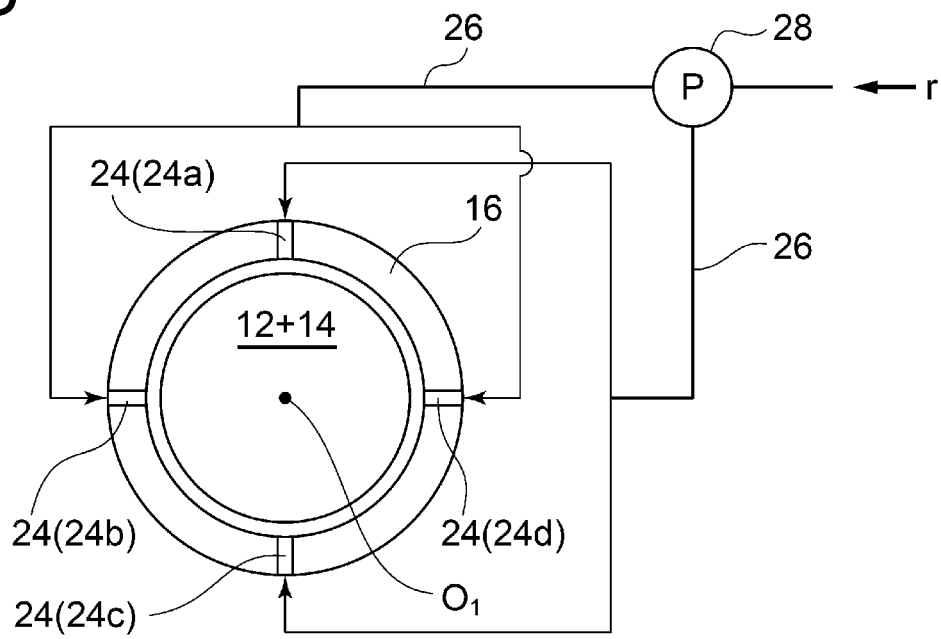
FIG. 3 is a schematic view showing a supply system for supplying lubricant oil to the bearing device.

FIG. 3 is a view showing a lubricant oil supply system, and schematically showing the rotational shaft 12 and the rolling bearing 14 as one structure (12+14). In an embodiment, the plurality of oil supply holes 24 (24a to 24d) are disposed symmetrically with respect to the axis $O_1$ of the rotational shaft 12 in a cross-section of the rotational shaft 12. According to the present embodiment, since the plurality of oil supply holes 24 (24a to 24d) are disposed symmetrically with respect to the axis $O_1$ of the rotational shaft 12, it is possible to equally supply the lubricant oil r to the gap $C_1$ in the circumferential direction of the rotational shaft 12. Thus, it is possible to form a good oil film in the gap $C_1$. For example, if the bearing device 10 (10A) is applied to a small rotating device such as a turbocharger, since the plurality of oil supply holes 24 (24a to 24d) are disposed symmetrically with respect to the axis $O_1$ of the rotational shaft 12, it is possible to supply lubricant oil with the same pressure to the gap $C_1$ in the circumferential direction of the rotational shaft 12. Thus, it is possible to form a uniform oil film in the gap $C_1$ along the circumferential direction of the rotational shaft 12.

In an embodiment, as shown in FIG. 3, the plurality of oil supply holes 24 are disposed at regular intervals in the circumferential direction of the casing 16, for example. The three oil supply holes 24 are disposed at intervals of 120°, or the four oil supply holes 24 are disposed at intervals of 90° so that the supply amount of lubricant oil is uniformly distributed in the circumferential direction of the rolling bearing 14. Further, the plurality of oil supply holes 24 are disposed in a direction orthogonal to an outer circumferential surface and an inner circumferential surface of the casing 16.

If the gap $C_1$ configures self-squeeze as in the above-described embodiment, the outlet opening of the oil supply hole 24 is formed to be the same as or smaller than the cross-sectional area of the upstream oil supply hole 24.

Figure 7:
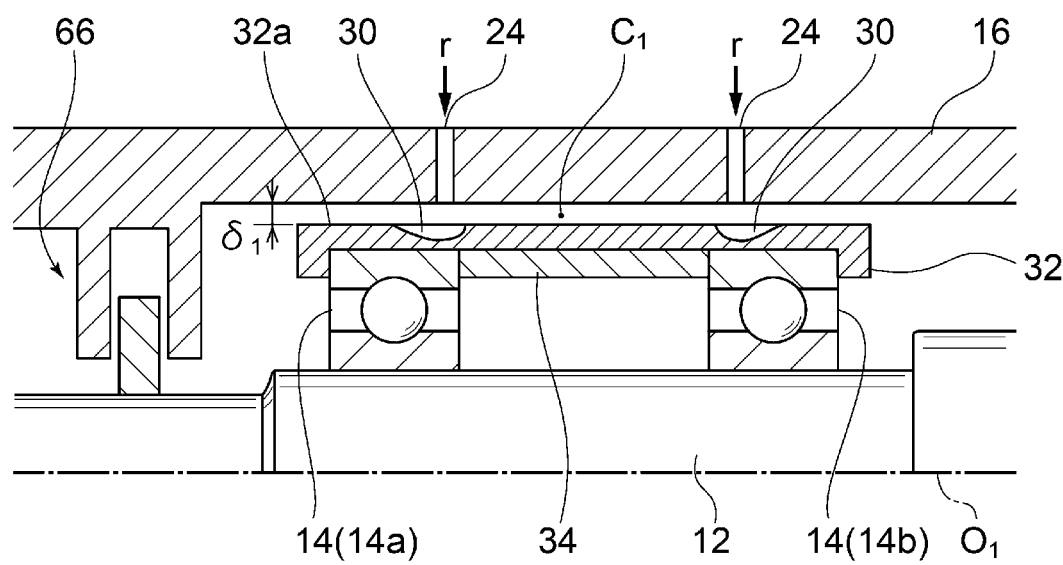
FIG. 7 is a vertical cross-sectional view of the bearing device according to an embodiment.
Figure 8:
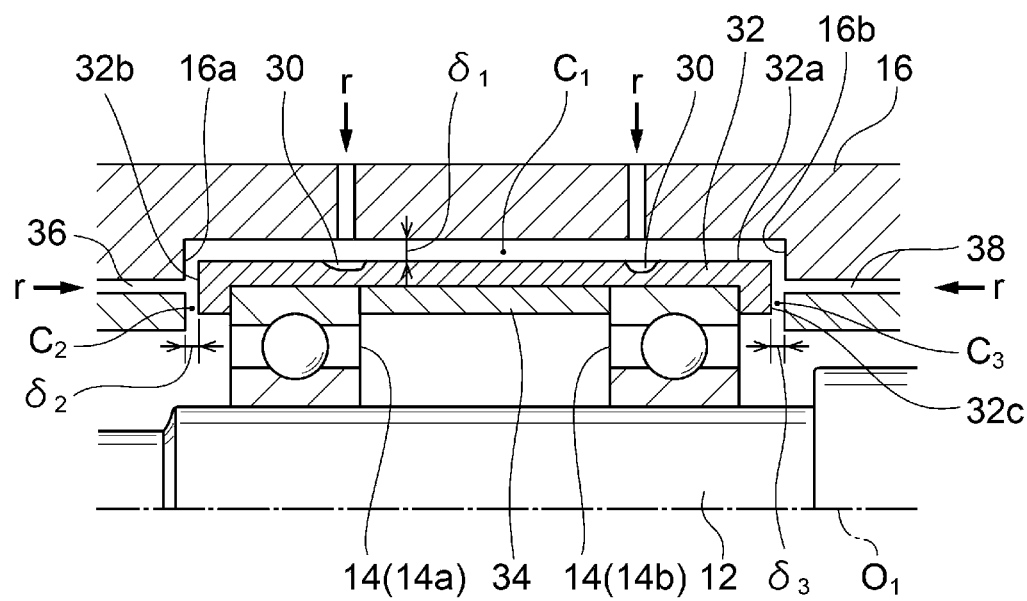
FIG. 8 is a vertical cross-sectional view of the bearing device according to an embodiment.

The above-described configuration of the bearing device 10 (10A) described so far also is also included in the bearing device 10 (10B, 10C) according to other embodiments shown in FIGS. 7 and 8 in common. Therefore, in FIGS. 7 and 8, the same members or same instruments as the bearing device 10 (10A) are indicated by the same reference numerals, respectively.

Figure 4:
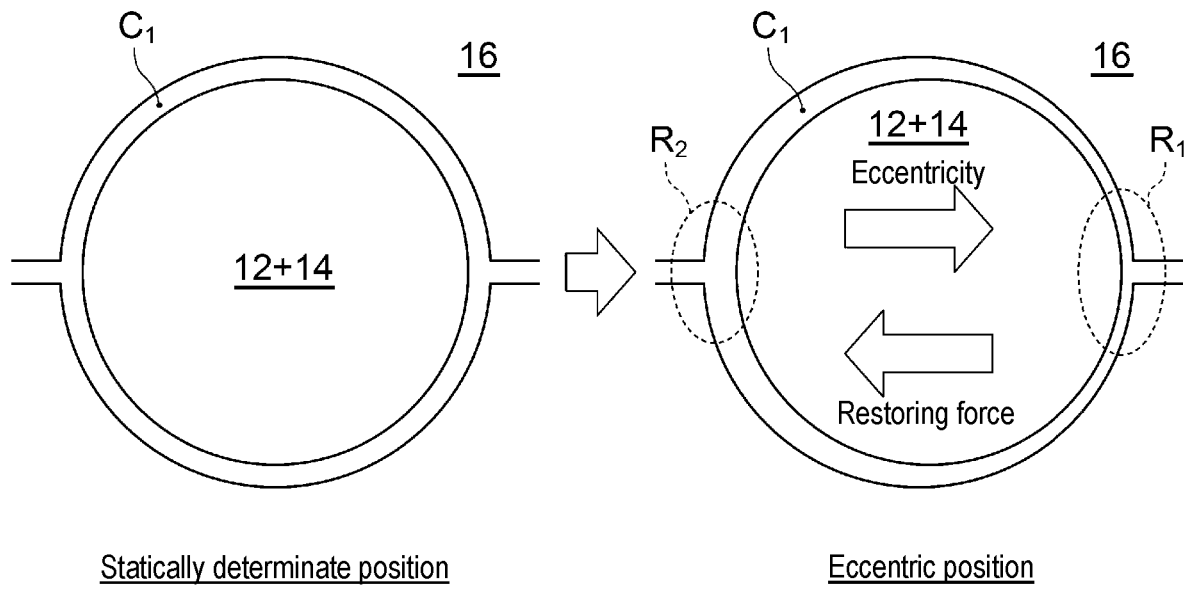
FIG. 4 is an explanatory view for describing a restoring force of a rotational shaft by a squeeze action of an oil film.

FIG. 4 is a view schematically showing the gap $C_1$ formed between the rolling bearing 14 and the casing 16. The gap $C_1$ satisfying the above-described expression (a) configures so-called self-squeeze for the lubricant oil r passing through the gap $C_1$ to exert a squeeze action. Therefore, it is possible to form the good oil film in the gap $C_1$ without using a mechanical means. If the rotational shaft 12 is eccentric in the radial direction due to a vibration or the like, a pressure loss increases in a region $R_1$ where the gap $C_1$ is narrowed, increasing a pressure. Therefore, a reverse restoring force from an eccentric direction acts on the rotational shaft 12, restoring the rotational shaft 12 to a side of a region $R_2$ where the gap $C_1$ is widened and a pressure is decreased. Thus, it is possible to hold the oil film in the gap $C_1$, and it is possible to damp the vibration of the rotational shaft 12 even if the rotational shaft 12 vibrates.

In an embodiment, as shown in FIG. 1, the bearing device 10 is provided to rotatably support the rotational shaft 12 of the rotating device 50. The rotating device 50 according to an embodiment illustrated in FIG. 1 is a turbocharger, and the bearing device 10 is housed in the casing 16 forming a part of a bearing housing 64. The turbocharger includes a compressor 52 and a turbine 54 at both ends of the rotational shaft 12. The compressor 52 is radially provided with a plurality of compressor blades 58 around a compressor wheel 56. The turbine 54 is radially provided with a plurality of turbine blades 62 around a turbine wheel 60. In the bearing housing 64, an oil channel 68 for the lubricant oil r communicating with the oil supply holes 24 is formed. In FIG. 1, a compressor housing for housing the compressor wheel 56 and the compressor blades 58, and a turbine housing for housing the turbine wheel 60 and the turbine blades 62 are not illustrated.

In an embodiment, as shown in FIGS. 1 and 2, the rotating device 50 includes a thrust bearing 66, and the thrust bearing 66 supports a thrust load loaded on the rotational shaft 12. In FIG. 2, the casing 16 disposed opposite to the rolling bearing 14 is not necessarily a body portion of the casing 16, but also includes attachment members such as a bearing mount and a sleeve attached to the body of the casing 16. Further, some measures (not shown) for suppressing detent in the circumferential direction of the rotational shaft 12 is provided for the rolling bearing 14, as needed.

In an embodiment, as shown in FIG. 3, the high-pressure lubricant oil r is supplied to the plurality of oil supply holes 24 (24a to 24d) by a pump 28 from a lubricant oil supply source (not shown) such as a lubricant oil tank (not shown) via a pipe passage 26.

Figure 5:
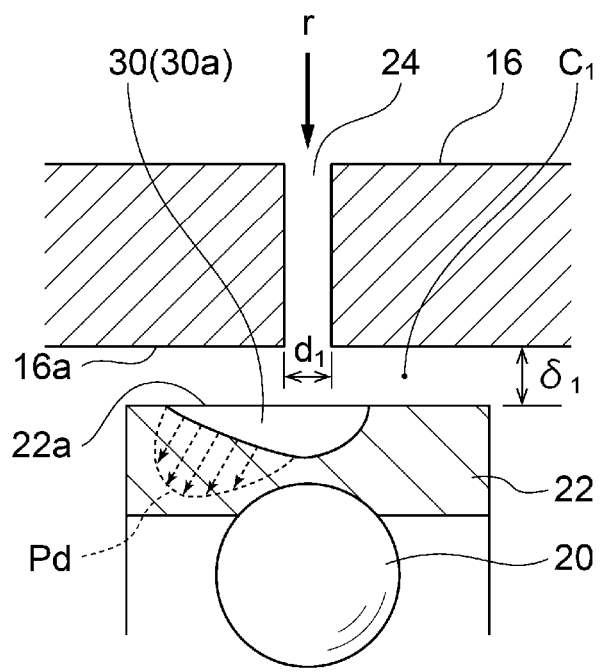
FIG. 5 is an enlarged view of an A portion in FIG. 2.
Figure 6:
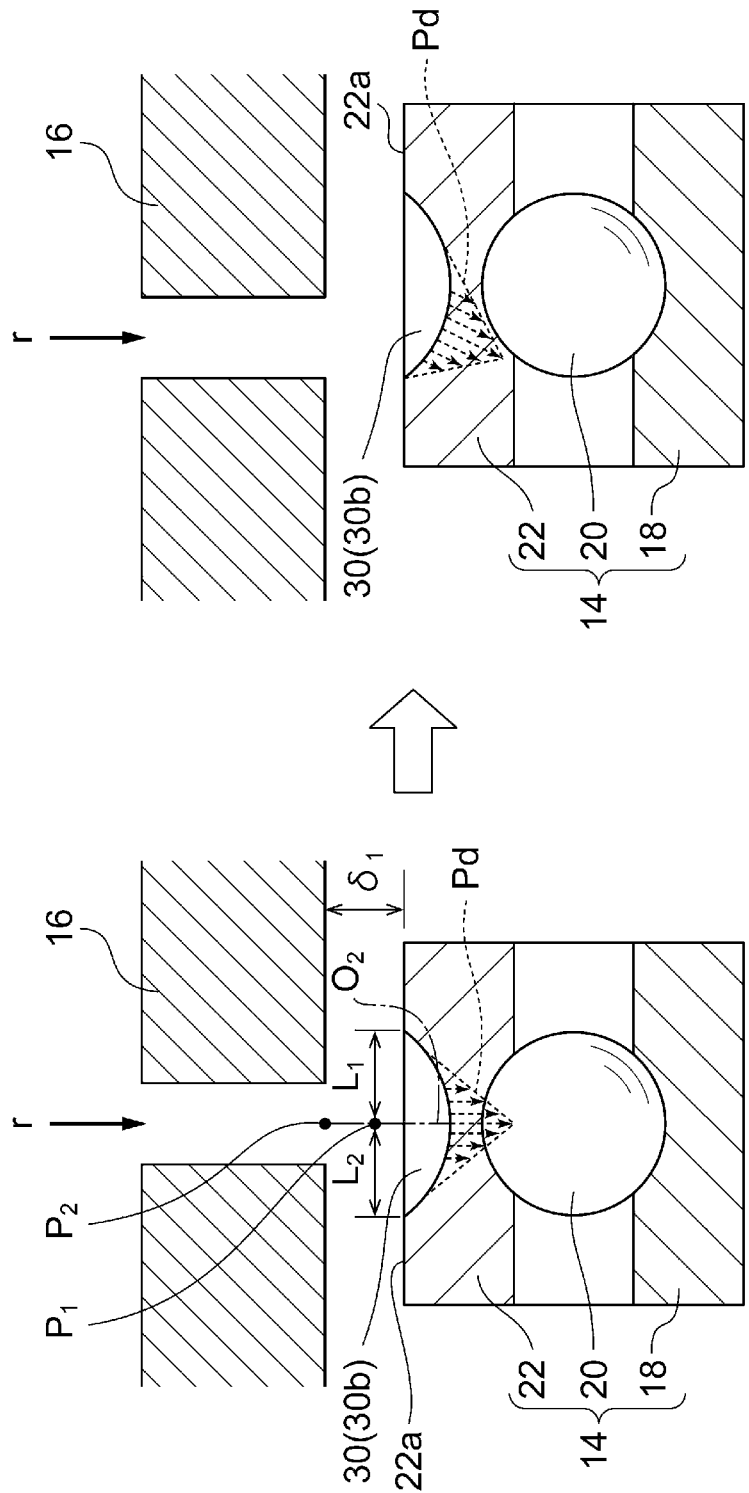
FIG. 6 is a cross-sectional view of the bearing device according to an embodiment.

FIG. 5 is an enlarged view of an A portion in FIG. 2. FIG. 6 is a view corresponding to the A portion in another embodiment. In an embodiment, as shown in FIGS. 5 and 6, a recess 30 (30a, 30b) (first recess) is formed in the opposite surface 22a (32a) opposite to the inner surface 16a of the casing 16 across the gap $C_1$. The opposite surface 22a (32a) indicates an outer circumferential surface 22a of the outer race 22 in the embodiment shown in FIG. 5, and indicates an outer circumferential surface 32a of a cover member 32 in the embodiments shown in FIGS. 7 and 8. The recess 30 is configured such that a cross-sectional area thereof in the direction orthogonal to the axis $O_1$ of the rotational shaft 12 decreases from a position where the cross-sectional area is maximum toward at least one side in the axial direction of the rotational shaft 12.

In an embodiment, the recess 30 is formed into, for example, an oval shape or a rectangular shape as viewed from the side of the casing 16. In the embodiment shown in FIG. 5, the recess 30 (30a) is configured such that a depth thereof decreases toward one side in the axial direction, but can be configured such that an interval between side surfaces forming the recess (a width dimension of the recess 30) is narrowed toward one side in the axial direction, even if the depth is constant in the axial direction.

According to the present embodiment, the lubricant oil r supplied from the oil supply holes 24 to the recess 30 via the gap $C_1$ accelerates toward the axial direction of the rotational shaft 12 along the surface of the recess 30, and a normal component force Pd is generated with respect to the surface of the recess 30 by a dynamic pressure of the lubricant oil r. The normal component force Pd becomes a force of restoring the eccentric rotational shaft 12 to a statically determinate position. Therefore, it is possible to have both of a self-squeeze effect on the oil film passing through the gap $C_1$ and an alignment effect in the radial direction of the rotational shaft 12 by the dynamic pressure of the lubricant oil r. Thus, it is possible to hold the oil film in the recess 30, and to exert the vibration damping effect even if the rotational shaft 12 vibrates in the radial direction.

The recess 30 is disposed in the opposite surface 22a (32a) opposite to an outlet opening of at least one oil supply hole 36.

The plurality of oil supply holes 24 (24a to 24d) are preferably formed along a direction orthogonal to the outer circumferential surface of the outer race 22 at least in the vicinity of the outlet opening. Thus, it is possible to reduce the pressure loss of the lubricant oil r and to increase the normal component force Pd acting on the surface of the recess 30.

In an embodiment, as shown in FIG. 5, the recess 30 (30a) is configured such that the depth thereof decreases toward one side in the axial direction. The lubricant oil r supplied from the oil supply holes 24 to the recess 30 (30a) flows along the surface of the recess 30 (30a) and accelerates toward the axial direction, and the normal component force Pd is generated with respect to the surface of the recess 30 (30a) by the dynamic pressure of the lubricant oil r. Therefore, it is possible to further increase the self-squeeze effect by the gap $C_1$ and the alignment effect in the radial direction of the rotational shaft 12 by the dynamic pressure of the lubricant oil r.

In an embodiment, as shown in FIG. 6, the recess 30 (30b) is configured such that a cross-sectional area thereof gradually decreases toward one side and another side in the axial direction from a position where the cross-sectional area is maximum. Further, the recess 30 (30b) is configured such that a distance $L_1$ from a position $P_1$ where the cross-sectional area is maximum to an end portion on the one side in the axial direction and a distance $L_2$ from the position where the cross-sectional area is maximum to an end portion on the another side in the axial direction are equal.

If the lubricant oil r is supplied to the recess 30 (30b), the lubricant oil r is branched to the one side or the another side in the axial direction on the surface of the recess 30 (30b). Thus, depending on a position where the lubricant oil r is supplied, it is possible to generate a force of moving the rotational shaft 12 to the one side or the another side. For example, if the lubricant oil is supplied to the position where the cross-sectional area is maximum, a distribution of the normal component force Pd generated on the surface of the recess 30 (30b) along the axial direction is symmetrical about the position where the cross-sectional area is maximum. Therefore, if the rotational shaft 12 moves in the axial direction from the statically determinate position due to the vibration or the like, the distribution of the normal component force Pd generated on the surface of the recess 30 (30b) along the axial direction is asymmetric. Thus, the dynamic pressure of the lubricant oil r acting on the surface of the recess 30 (30b) in an opposite direction to the moving direction of the rotational shaft 12 increases, applying a force of restoring the rotational shaft 12 to an original statically determinate position. Therefore, in addition to the self-squeeze effect of the oil film and the alignment effect in the radial direction by the dynamic pressure of the lubricant oil r, it is possible to exert an alignment effect in a thrust direction.

In an embodiment, as shown in FIGS. 5 and 6, the recess 30 (30a, 30b) is configured such that the position where the cross-sectional area is maximum is opposite to the outlet opening of the oil supply hole 24. In addition to the technical effects by the above-described embodiments, when the rotational shaft 12 is at the statically determinate position, the lubricant oil r discharged from the outlet opening of the oil supply hole 24 is supplied to the position where the cross-sectional area of the recess 30 is maximum, making it possible to efficiently convert kinetic energy of the lubricant oil r into the dynamic pressure acting on the surface of the recess 30.

In an embodiment, it is configured such that the position $P_1$ where the cross-sectional area of the recess 30 (30a, 30b) is maximum is opposite to a center point $P_2$ of the outlet opening of the oil supply hole 24. That is, it is configured such that the point $P_1$ and the center point $P_2$ are on a perpendicular line $O_2$. Thus, when the rotational shaft 12 is at the statically determinate position, the lubricant oil r discharged from the outlet opening of the oil supply hole 24 is accurately supplied to the position where the cross-sectional area of the recess 30 is maximum, making it possible to efficiently convert the kinetic energy of the lubricant oil r into the dynamic pressure acting on the surface of the recess 30.

FIG. 6 shows that the rolling bearing 14 moves in an arrow direction (right side in drawing) from the statically determinate position together with the rotational shaft 12, due to occurrence of the vibration of the rotational shaft 12. If the rotational shaft 12 moves from the statically determinate position to one side in the axial direction, the distribution of the normal component force Pd over the axial direction formed on the surface of the recess 30 (30b) is asymmetric as illustrated in FIG. 6. That is, the normal component force Pd generated on the surface of the recess 30 (30b) in the opposite direction to the moving direction of the rotational shaft 12 increases. By a difference in asymmetric normal component force Pd, the force of restoring the rotational shaft 12 to the original statically determinate position in the thrust direction is applied. Thus, in addition to the self-squeeze effect of the oil film by the gap $C_1$ and the alignment effect in the radial direction by the dynamic pressure of the recess 30 (30b), it is possible to exert the alignment effect in the thrust direction.

In an embodiment, the cross-section of the recess 30 (30b) has an arc shape. Further, in an embodiment, the cross-section of the recess 30 (30b) has a symmetrical shape with respect to the perpendicular line $O_2$ perpendicular to the outer circumferential surface of the outer race 22 passing through the point $P_1$ at the statically determinate position. Thus, when the rotational shaft 12 is at the statically determinate position, the distribution of the normal component force Pd is symmetric with respect to the perpendicular line $O_2$, and the normal component force Pd is balanced in the axial direction. Consequently, when the rotational shaft 12 moves in the axial direction from the statically determinate position due to the vibration or the like, the asymmetrical distribution of the normal component force Pd can sensitively be expressed, and thus the force of restoring the rotational shaft 12 can sensitively be expressed.

In an embodiment, the bearing device 10 (10B) shown in FIG. 7 includes the plurality of rolling bearings 14 (14a, 14b) disposed at intervals in the axial direction of the rotational shaft 12, and the cover member 32 is disposed so as to cover respective perimeters of the plurality of rolling bearings 14. Then, the recesses 30 are disposed in the outer circumferential surface 32a (opposite surface) of the cover member 32. Each of the recesses 30 may be the recess 30 (30a) shown in FIG. 5 or may be the recess 30 (30b) shown in FIG. 6. Since the recesses 30 are formed in the outer circumferential surface 32a of the cover member 32, the dynamic pressure of the lubricant oil r is transmitted to the plurality of rolling bearings 14 (14a, 14b) via the cover member 32. Therefore, an equal force acts on the respective rolling bearings 14 from the cover member 32, and the respective rolling bearings 14 are uniformly moved by the cover member 32, making it possible to improve the alignment effect with respect to the rotational shaft 12.

In an embodiment, if the recesses 30 (30a) are formed in the outer circumferential surface 32a of the cover member 32, the two recesses 30 (30a) are formed such that directions in which the cross-sectional areas thereof gradually decrease are opposite to each other. Thus, the normal component forces Pd in directions other than the radial direction are generated in the opposite direction in the two recesses 30 (30a), and thus cancel each other out. Therefore, an excessive force is not applied in the thrust direction.

In an embodiment, the cover member 32 basically has a cylindrical shape, and a partition wall forming the outer circumferential surface 32a can exist at least at a position opposite to the oil supply holes 24. Further, the cover member 32 internally includes a restriction part 34 for restricting an axial movement of each rolling bearing 14. The restriction part 34 includes an annular recess where the outer race 22 of the rolling bearing 14 is fitted, and the outer race 22 is fitted with the recess, thereby restricting the axial movement.

In an embodiment, in the bearing device 10 (10C) shown in FIG. 8, an oil supply hole 36 (second oil supply hole) and an oil supply hole 38 (third oil supply hole) are formed in the casing 16. The oil supply hole 36 supplies the lubricant oil r to a gap $C_2$ (second gap) between an axial end surface 32b of the cover member 32 and an inner surface 16a of the casing 16. The oil supply hole 38 supplies the lubricant oil r to a gap $C_3$ (third gap) between an axial end surface 32c of the cover member 32 and an inner surface 16b of the casing 16. The oil supply hole 36 satisfies:

$$\pi \cdot d_2 \cdot \delta_2 < \pi \cdot d_2^2/4, \quad (b)$$

where $d_2$ is a diameter of an outlet opening of the oil supply hole 36, and $\delta_2$ is a space of the gap $C_2$, and the oil supply hole 38 satisfies:

$$\pi \cdot d_3 \cdot \delta_3 < \pi \cdot d_3^2/4, \quad (c)$$

where $d_3$ is a diameter of an outlet opening of the oil supply hole 38, and $\delta_3$ is a space of the gap $\delta_3$.

According to the present embodiment, self-squeeze by the squeeze action of the oil film is configured when the lubricant oil r supplied from the oil supply hole 36 and the oil supply hole 38 passes through the gap $C_2$ and the gap $C_3$, respectively, making it possible to form the good oil film in the gap $C_2$ and the gap $C_3$ without using the mechanical means. Further, even if the rotational shaft 12 moves to one side or another side in the thrust direction from the statically determinate position due to the vibration, it is possible to damp the vibration in the thrust direction and to exert the alignment effect of restoring the rotational shaft 12 to the original statically determinate position. Therefore, the bearing device 10 (10C) can have both of the alignment effect in the radial direction by self-squeeze on the lubricant oil r supplied from the oil supply holes 24, and the alignment effect in the thrust direction by self-squeeze on the lubricant oil r supplied from the oil supply holes 36 and 38.

In an embodiment, a plurality of oil supply holes 36 and 38 are formed at a regular interval in the circumferential direction of the rotational shaft 12. Further, the oil supply holes 36 and 38 are formed along a direction orthogonal to the inner circumferential surface of the casing 16 at least in the vicinity of the outlet opening. Thus, it is possible to reduce the pressure loss of the lubricant oil and to increase the normal component force Pd generated on the surfaces of recesses 40 and 42.

Figure 9:
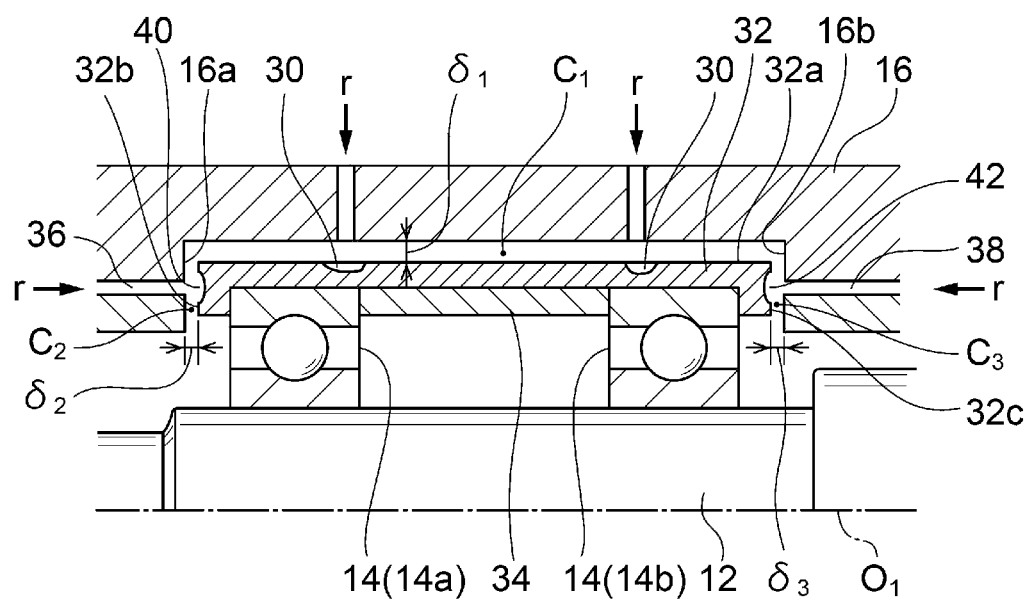
FIG. 9 is a vertical cross-sectional view of the bearing device according to an embodiment.

In an embodiment, as shown in FIG. 9, the recess 40 is formed in the axial end surface 32b of the cover member 32 opposite to the inner surface 16a of the casing 16 across the gap $C_2$. Further, the recess 42 is formed in the axial end surface 32c of the cover member 32 opposite to the inner surface 16b of the casing 16 across the gap $C_3$. The recesses 40 and 42 are each configured such that a cross-sectional area thereof in a direction parallel to the axis $O_1$ of the rotational shaft 12 decreases from a position where the cross-sectional area is maximum toward at least one side in the radial direction of the rotational shaft 12.

According to the present embodiment, the lubricant oil r supplied from the oil supply hole 36 to the recess 40 accelerates toward the radial direction, generating the normal component force Pd with respect to the surface of the recess 40 by the dynamic pressure of the lubricant oil r. The normal component force Pd becomes a force of restoring the rotational shaft 12 moved in the thrust direction to the statically determinate position. The same normal component force acts also in the lubricant oil r supplied from the oil supply hole 38 to the recess 42. Therefore, in the present embodiment, it is possible to have both of the self-squeeze effect of the oil film and the alignment effect in the radial direction of the rotational shaft 12 by the dynamic pressure of the lubricant oil r. Thus, it is possible to exert the vibration damping effect even if the rotational shaft 12 vibrates in the radial direction. Therefore, the bearing device 10 (10C) can have both of the self-squeeze effect on the oil film supplied from the oil supply holes 24 and the alignment effect in the radial direction by the recess 30, and the self-squeeze effect on the oil film supplied from the oil supply holes 36 and 38 and the alignment effect in the thrust direction by the recesses 40 and 42.

In an embodiment, the recesses 40 and 42 have the same shape as the recess 30 (30a) or the recess 30 (30b). Thus, it is possible to exert the alignment effect in the radial direction by the normal component force Pd generated on the surface of the recess 30 (30a, 30b).

In an embodiment, in the bearing device 10 (10C) shown in FIG. 8, the oil supply holes 24 and the recess 30 may be omitted, and only the oil supply holes 36 and 38 may be provided. Thus, self-squeeze by the squeeze action of the oil film is configured when the lubricant oil r supplied from the oil supply holes 36 and 38 passes through the gap $C_2$ and the gap $C_3$, respectively. Thus, it is possible to form the good oil film in the gap $C_2$ and the gap $C_3$ without using the mechanical means, and even if the rotational shaft 12 moves to one side or another side in the thrust direction from the statically determinate position due to the vibration, it is possible to damp the vibration in the thrust direction and to exert the alignment effect of restoring the rotational shaft 12 to the original statically determinate position.

In an embodiment, as shown in FIG. 9, the oil supply holes 24 and the recess 30 may be omitted, and only the oil supply holes 36 and 38, and the recesses 40 and 42 may be provided. Thus, it is possible to have both of the self-squeeze effect on the oil film by the gap $C_2$ and $C_3$, and the alignment effect in the radial direction of the rotational shaft 12 by the dynamic pressure of the lubricant oil r. Thus, it is possible to exert the vibration damping effect even if the rotational shaft 12 vibrates in the radial direction. Therefore, a thrust bearing provided for the rotational shaft can be omitted, in some cases.

Since the rotating device 50 shown in FIG. 1 includes the bearing device 10 according to each embodiment described above, it is possible to form self-squeeze by the squeeze action of the lubricant oil film in the gap between the rolling bearing 14 and the casing 16 for housing the rolling bearing 14. Thus, it is possible to suppress radial eccentricity of the rotational shaft 12 due to the vibration, making it possible to exert the vibration damping effect of the rotational shaft 12.

The turbocharger has been taken as an example of the rotating device shown in FIG. 1. However, each embodiment described above is also applicable to another rotating device including the rotational shaft.

INDUSTRIAL APPLICABILITY

According to some embodiments, in a rotating device including a rotational shaft, if the rotational shaft is supported by a rolling bearing, it is possible to effectively suppress a vibration without using a mechanical means.

REFERENCE SIGNS LIST

10 (10A, 10B, 10C) Bearing device
12 Rotational shaft
14 (14a, 14b) Rolling bearing
16 Casing
16a, 16b Inner surface
18 Inner race
20 Rolling element
22 Outer race
22a Outer circumferential surface (opposite surface)
24 (24a, 24b, 24c, 24d) Oil supply hole (first oil supply hole)
26 Pipe passage
28 Pump
30 (30a, 30b) Recess (first recess)
32 Cover member
32a Outer circumferential surface (opposite surface)
32b, 32c Axial end surface
34 Restriction part
36 Oil supply hole (second oil supply hole)
38 Oil supply hole (third oil supply hole)
40 Recess (second recess)
42 Recess (third recess)
50 Rotating device
52 Compressor
54 Turbine
56 Compressor wheel
58 Compressor blade
60 Turbine wheel
62 Turbine blade
64 Bearing housing
66 Thrust bearing
68 Oil channel $C_1$ Gap (first gap)
$C_2$ Gap (second gap)
$C_3$ Gap (second gap)
$O_1$ Axis
$O_2$ Center line
$P_2$ Center point
Pd Normal component force
r Lubricant oil

The invention claimed is:

1. A bearing device for rotatably supporting a rotational shaft, the device comprising:
    at least one rolling bearing which includes an inner race fixed to the rotational shaft, a rolling element, and an outer race for rotatably holding the rolling element with the inner race; and
    a casing for housing the rolling bearing, the casing including a plurality of first oil supply holes formed at intervals in a circumferential direction for supplying lubricant oil to a first gap between the rolling bearing and an inner circumferential surface of the casing,
    wherein each of the plurality of first oil supply holes satisfies:

$$\pi \cdot d_1 \cdot \delta_1 < \pi \cdot d_1^2/4, \qquad (a)$$

where $d_1$ is a diameter of an outlet opening of the first oil supply hole, and $\delta$ is a space of the first gap.

2. The bearing device according to claim 1, wherein the plurality of first oil supply holes are disposed symmetrically with respect to an axial center of the rotational shaft in a cross-section of the rotational shaft.

3. The bearing device according to claim 1, wherein, in an opposite surface opposite to the inner circumferential surface of the casing across the first gap, a first recess is formed which is configured such that a cross-sectional area thereof in a direction orthogonal to an axis of the rotational shaft decreases from a position where the cross-sectional area is maximum toward at least one side in an axial direction.

4. The bearing device according to claim 3, wherein the first recess is configured such that a depth thereof decreases toward the one side in the axial direction.

5. The bearing device according to claim 3, wherein the first recess
    is configured such that the cross-sectional area decreases from the position where the cross-sectional area is maximum toward each of the one side and another side in the axial direction, and
    is configured such that a distance from the position where the cross-sectional area is maximum to an end portion on the one side in the axial direction and a distance from the position where the cross-sectional area is maximum to an end portion on the another side in the axial direction are equal.

6. The bearing device according to claim 3, wherein the first recess is configured such that the position where the cross-sectional area is maximum is opposite to the outlet opening of the first oil supply hole.

7. The bearing device according to claim 3, wherein the at least one rolling bearing includes a plurality of rolling bearings disposed at intervals in the axial direction of the rotational shaft,
    wherein the bearing device further includes a cover member configured to cover respective perimeters of the plurality of rolling bearings, and
    wherein the opposite surface is constituted by an outer circumferential surface of the cover member.

8. The bearing device according to claim 7,
wherein the casing forms a second oil supply hole for supplying the lubricant oil to a second gap between an inner surface of the casing and an axial one end surface of the cover member, and a third oil supply hole for supplying the lubricant oil to a third gap between the inner surface of the casing and an axial another end surface of the cover member, and
wherein each of the plurality of first oil supply holes satisfies:

$$\pi \cdot d_2 \cdot \delta_2 < \pi \cdot d_2^2/4, \tag{b}$$

where $d_2$ is a diameter of an outlet opening of the second oil supply hole, and $\delta$ is a space of the second gap; and $$\pi \cdot d_3 \cdot \delta_3 < \pi \cdot d_3^2/4, \tag{c}$$

where $d_3$ is a diameter of an outlet opening of the third oil supply hole, and $\delta$ is a space of the third gap.

9. The bearing device according to claim 8,
wherein, in the axial one end surface opposite to the inner surface of the casing across the second gap, a second recess is formed which is configured such that a cross-sectional area thereof in a direction parallel to the axis of the rotational shaft decreases from a position where the cross-sectional area is maximum toward at least one side in a radial direction, and
wherein, in the axial another end surface opposite to the inner surface of the casing across the third gap, a third recess is formed which is configured such that a cross-sectional area thereof in the direction parallel to the axis of the rotational shaft decreases from a position where the cross-sectional area is maximum toward the at least one side in the radial direction.

10. A rotating device, comprising:
a rotational shaft; and
the bearing device according to claim 1.

11. A bearing device for rotatably supporting a rotational shaft, the device comprising:
a plurality of rolling bearings disposed at intervals in an axial direction of the rotational shaft, the rolling bearings each including an inner race fixed to the rotational shaft, a rolling element, and an outer race for rotatably holding the rolling element with the inner race;
a cover member configured to cover respective perimeters of the plurality of rolling bearings; and
a casing for housing the plurality of rolling bearings and the cover member, the casing forming a second oil supply hole for supplying lubricant oil to a second gap between an inner surface of the casing and an axial one end surface of the cover member, and a third oil supply hole for supplying the lubricant oil to a third gap between the inner surface of the casing and an axial another end surface of the cover member,
wherein the second oil supply hole satisfies:

$$\pi \cdot d_2 \cdot \delta_2 < \pi \cdot d_2^2/4, \tag{b}$$

where $d_2$ is a diameter of an outlet opening of the second oil supply hole, and $\delta$ is a space of the second gap, and
wherein the third oil supply hole satisfies:

$$\pi \cdot d_3 \cdot \delta_3 < \pi \cdot d_3^2/4, \tag{c}$$

where $d_3$ is a diameter of an outlet opening of the third oil supply hole, and $\delta$ is a space of the third gap.

12. The bearing device according to claim 11,
wherein, in the axial one end surface opposite to the inner surface of the casing across the second gap, a second recess is formed which is configured such that a cross-sectional area thereof in a direction parallel to the axis of the rotational shaft decreases from a position where the cross-sectional area is maximum toward at least one side in a radial direction, and
wherein, in the axial another end surface opposite to the inner surface of the casing across the third gap, a third recess is formed which is configured such that a cross-sectional area thereof in the direction parallel to the axis of the rotational shaft decreases from a position where the cross-sectional area is maximum toward the at least one side in the radial direction.

* * * * *